Feb. 21, 1956   W. C. EAVES ET AL   2,735,693
MUD GUARD FOR TRACTOR CAB
Filed May 29, 1952
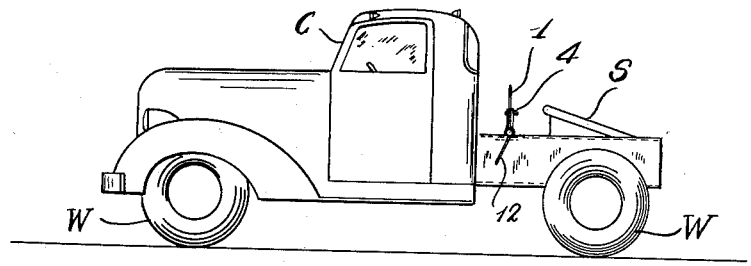
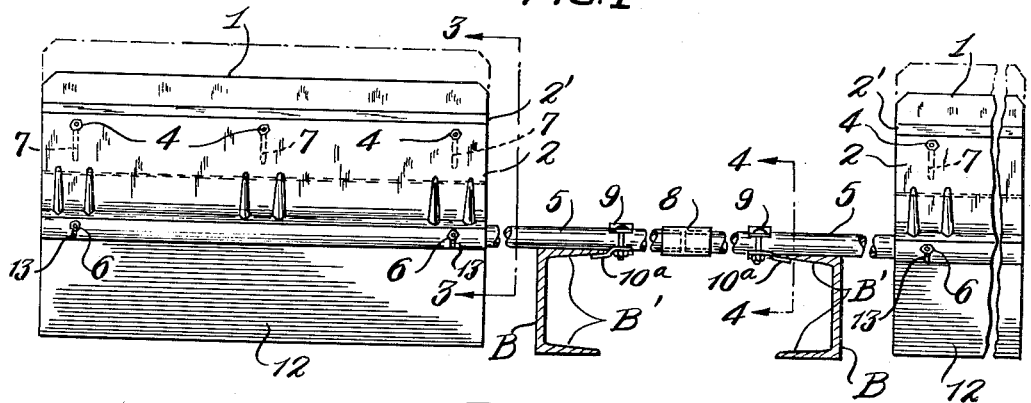
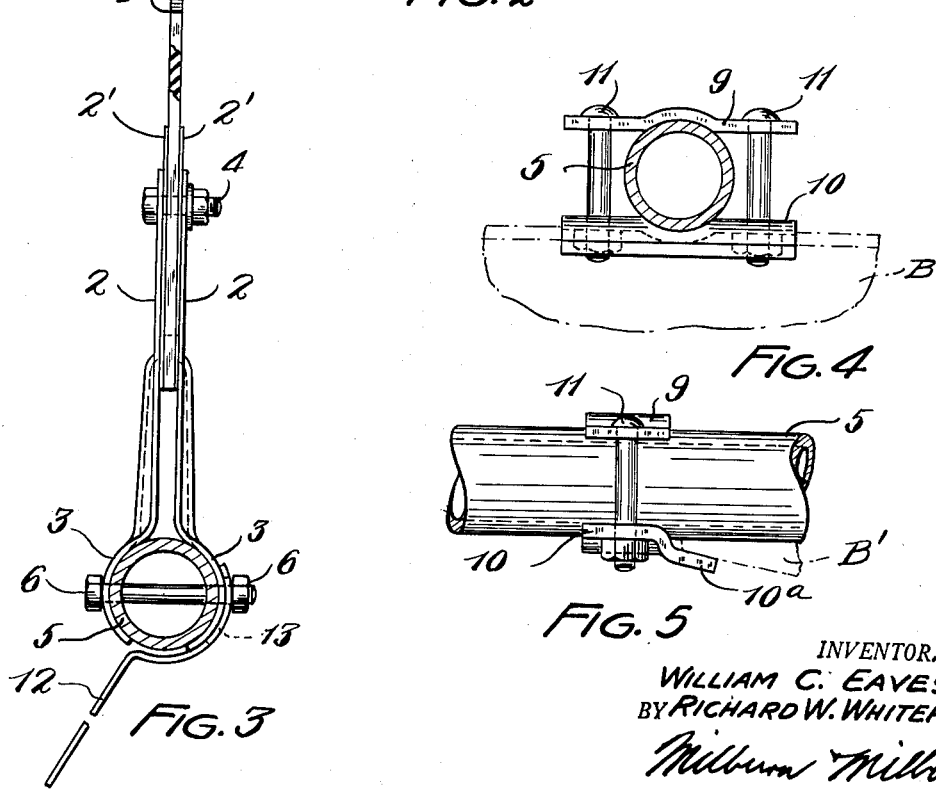
INVENTORS
WILLIAM C. EAVES
BY RICHARD W. WHITEHILL
Milburn Milburn
ATTORNEYS

United States Patent Office 2,735,693
Patented Feb. 21, 1956

2,735,693

MUD GUARD FOR TRACTOR CAB

William C. Eaves, Elyria, and Richard W. Whitehill, Cleveland, Ohio

Application May 29, 1952, Serial No. 290,666

10 Claims. (Cl. 280—154.5)

This invention relates to the general art of truck tractors and, more specifically, is for an improved means for preventing moisture, oil, grease and dirt from being thrown from the road-way onto the rear of the tractor cab as well as upon any equipment or any other surface in the path of such throw.

As is well known, a truck tractor consists of a cab body and chassis with front and rear wheels and also a fifth-wheel for connecting a semi-trailer to the rear end of the tractor. It is also well known that the rear wheels of a truck tractor will throw dirty water as well as grease and oil from the road-way onto the rear of the cab body and elsewhere in its path of such throw, with the result that it is practically impossible to keep these parts of the truck tractor clean.

Therefore the object of our present invention is to devise a means for preventing the rear wheels of the truck tractor from throwing such foreign matter from the road-way onto the rear of the cab body and upon other surfaces in the path of such throw.

Another object is to provide such a device that may include both upwardly and downwardly extending means for this purpose.

A more specific object of our present invention is to devise a means for readily attaching such a guard means to the chassis of a truck tractor so that it can be removed at any time it may be desired to renew the guard member itself or for any purpose.

Another object is to devise such a means that can be manufactured at a reasonable cost and can be readily assembled upon the chassis and may be capable of adjustment according to the height desired for the guard means.

Other objects may appear from the following description and claims when considered together with the accompanying drawing.

Fig. 1 is a side elevation of a truck tractor with our present device installed thereupon and illustrates the relative location of the same with respect to the rear wheels and the rear wall of the cab;

Fig. 2 is a view, partly broken away, showing in elevation our assembly as applied to the channel bars of the chassis;

Fig. 3 and Fig. 4 are views taken on lines 3—3 and 4—4, respectively, of Fig. 2; and Fig. 5 is an enlarged view of part of Fig. 2, illustrating the manner of securing our assembly in position upon the channel bars of the chassis.

Referring now to the accompanying drawing in detail, the familiar automobile truck tractor may be recognized as comprising the cab C, the channel bars B of the chassis frame, and the front and rear wheels W. As will be understood, the channel bars B extend parallel to each other in a direction longitudinally of the chassis; and the lateral flanges B' of these channel bars extend inwardly thereof towards each other, as indicated in Fig. 2 hereof. The familiar type of truck tractor has also at the rear thereof a fifth-wheel S for detachably connecting a semi-trailer.

Our present improved device is adapted and intended to be applied to the conventional truck tractor at a point between the cab C and the rear wheels W and the fifth-wheel S and may be extended across the channel bars B at substantially right angle thereto, as indicated in Fig. 1 hereof.

In order to intercept any moisture or other foreign matter that might be thrown otherwise by the rear wheels W onto the rear wall of the cab body C when the semi-trailer is attached to the fifth-wheel S, we have provided means for supporting a flat body of semi-rigid sheet rubber 1 or other suitable material, with the requisite flexibility for the purpose intended, between each rear wheel W and the rear of the cab C. The guard means including the rubber body 1 will extend upward to sufficient extent to prevent any such moisture or other foreign matter from being thrown onto the rear of the cab body C and upon other surfaces in the path of such throw but the flexible body 1 will not interfere with the turning of the truck tractor. Since duplicate means are employed for supporting the rubber members 1 at each side of the chassis, a detailed description of one of them will suffice.

The rubber sheet member 1 may be clamped between companion duplicate metal members each of which comprises the upwardly extending clamping portion 2 and the lower substantially semi-cylindrical portion 3. The rubber member 1 is adapted to be clamped between the portions 2 by means of the bolts 4, and the lower portions 3 are adapted to be engaged about the cylindrical tube 5 and held in such fixed position by means of the bolts 6. There may be vertical adjustment of the rubber member 1 by virtue of the slots 7 that are provided in the clamping portions 2 and through which the bolts 4 extend.

The tubular member 5 in each instance may extend to a point approximately mid-way of the chassis; and these two tubular members 5, which will be positioned in transverse alignment, may be secured together by means of the sleeve 8.

In each instance the tubular member 5 may be secured to the top lateral flange B' of its channel bar by means of the upper and lower clamping members 9 and 10, respectively, which are adapted to be secured in firm clamping engagement by means of the bolts 11. These clamping members are each bowed in their middle portions so as to have effective seating engagement with the curved surface of the tube 5 at the upper and lower parts thereof; and the lower clamping member 10 has a downwardly extending flange portion 10a which is adapted to be engaged beneath the edge portion of the upper flange B' of the channel bar for firm holding engagement therewith. Thus, with the guard device in proper position so as to intercept any moisture and dirt or the like that might otherwise be thrown by the rear wheels W onto the rear of the cab C or some other surface in the path of such throw, the clamping unit 9–10 will be slid along the tubular member 5 so as to wedge the angular flange 10a into firm engagement beneath the lateral flange B' of the channel bar and thereby effect firm clamping engagement of the channel bar flange B' between the flange portion 10a and the tubular member 5; whereupon the bolts 11 will be tightened so as to hold these parts securely in such assembly. By such tightening of the bolts 11, there may be effected a slight flattening of the tubular member 5 and this will tend still further to ensure secure assembly of these parts in the desired position and to keep them from turning.

The member 1 will be of sufficient height for desired flexibility to permit the same to be flexed beneath trailer body C if necessary upon turning of the tractor, yet not so high as to prevent it from standing in a substantially upright position at other times; and it is calculated that, with the proper height of the clamping portions 2 and the adjustment provided for the rubber member 1, this one assembly may possibly be capable of meeting the requirements of all situations. However, it is possible to insert between the plates 2 and auxiliary pair of clamping plates which will be adjustable therewithin by means of bolts and slots in the same manner as herein disclosed; and the rubber member 1 may then be clamped between the auxiliary plates with the same type of adjustment as herein shown for varying the height thereof. Thus, if and whenever required by particular conditions as above referred to, the height of the guard member 1 may be extended to practically any point desired. The advantage of this extensible arrangement resides in the fact that it will preclude the necessity of making the flexible member 1 of such height as to prevent it from maintaining its upright position; although it is to be understood that in the form of assembly as herein illustrated the clamping portions 2 may extend to as high a point as practical so as to be adapted for substantially all conditions.

As illustrative of the extensible feature just referred to for the rubber member 1, we have indicated in Figs. 2, 3 of the present drawing the metal plates 2' which are inserted between the plates 2. By providing slots in both sets of plates 2 and 2', it will be possible to adjust the height of the auxiliary plates 2' to any point desired and to thereby vary the extent to which the rubber member 1 projects above the upper edge of its holding means. It is to be understood, as above noted, that the rubber member 1 will project above its holding means to sufficient extent to afford proper flexibility for the purpose intended, as above more fully explained.

As a further means of protection against the throwing of dirty water etc. from the rear wheels W, there may be added a downwardly inclined guard member 12 at each side of the chassis, as indicated in Figs. 1, 2 and 3 of the present drawing. The guard plate 12 may be a duplicate of one of the plates 2 except that the curved part of the plate 12 is provided with vertically arranged slots 13 instead of the holes for the bolts 6, and the rubber member 1 may or may not be included. The curved part of this auxiliary plate 12, in each instance, may be placed upon the outside of the curved part 3 of the upright plate, as herein illustrated, or may be placed between the tube 5 and the curved part 3 of one of the upright plates 2; and the purpose of the slots 13 is to permit the depending guard plate 12 in each instance to be set at any desired angle about the longitudinal axis of the tubular member 5. The guard member 12 is here illustrated as being inclined forwardly but it may be inclined rearwardly if so desired by installing the same upon the opposite side of the upright plate assembly and provided that there be sufficient clearance to accommodate such position of the same; that is, the guard plate 12 may be regarded as being reversible, and it is to be noted that the upwardly and downwardly extending plates are adapted to be secured in assembly by means of the same bolts 6.

It is to be understood that the present form of disclosure is merely for the purpose of illustration and that there might be various modifications thereof without departing from the spirit of our invention as herein set forth and claimed.

The practical advantages of our present invention are believed to be obvious to those who are familiar with the art to which it relates.

What we claim is:

1. In combination, a truck tractor having a cab body and chassis with front and rear wheels, said chassis including channel bars extending longitudinally thereof, rigid guard-holding means extending transversely across said channel bars and positioned at a point between said rear wheels and said cab body, flexible guard means having its lower portion secured to said holding means in a plane substantially parallel thereto and extending upwardly at least to a point to intercept the throw of moisture and other foreign matter from said rear wheels onto the rear of said cab body and elsewhere in the path of such throw, and means for attaching said holding means in wedging engagement with the flanges of said channel bars.

2. In combination, a truck tractor having a cab body and chassis with front and rear wheels, said chassis including channel bars extending longitudinally thereof, rigid tubular guard-holding means extending transversely across said channel bars and positioned at a point between said rear wheels and said cab body, means secured about said tubular holding means and having a flexible guard means in a plane substantially parallel thereto extending upwardly at least to a point to intercept the throw of moisture and other foreign matter from said rear wheels onto the rear of said cab body and elsewhere in the path of such throw, and means for attaching said holding means in laterally wedging engagement with the flanges of said channel bars.

3. In the art of truck tractors, a cylindrical tubular member adapted to extend across the channel bars of a truck tractor chassis at a point between the rear wheels and the rear wall of the cab of the tractor, duplicate holding means having their lower portions each of semicylindrical form and adapted to be applied about said tubular member, a flat body of flexible material extending upwardly from and beyond said holding means and arranged therebetween, means for securing said holding means in fixed position about said tubular member, means for providing vertical adjustment between said flexible body and said holding means, and means for attaching said tubular member in wedging engagement with the flanges of the channel bars of the chassis of a truck tractor for securing the same in assembly, said flexible body and the holding means therefor being of sufficient height to intercept the moisture and other foreign matter that would otherwise be thrown from the rear wheels onto the rear wall of the cab body of the truck tractor and elsewhere in the path of such throw.

4. In combination, a truck tractor having a cab body and chassis with front and rear wheels, rigid guard-holding means extending transversely across said chassis and positioned at a point between said rear wheels and said cab body, flexible substantially flat guard means having its lower portion secured to said holding means in a plane substantially parallel thereto and extending upwardly to a point to intercept the throw of moisture and other foreign matter from said rear wheels onto the rear of said cab body and elsewhere in the path of such throw, downwardly extending substantially flat guard means, and unitary means for attaching said upwardly and downwardly extending guard means to said holding means.

5. In combination, a truck tractor having a cab body and chassis with front and rear wheels, rigid cylindrical guard-holding means extending transversely of said chassis and positioned at a point between said rear wheels and said cab body, guard means having its lower portion curved to engage about said holding means and extending upwardly to a point to intercept the throw of moisture and other foreign matter from the rear wheels onto the rear of the cab body and elsewhere in the path of such throw, downwardly extending guard means having its upper portion provided with substantially the same curvature as the lower part of said upper guard means, and a single means for securing the curved portions of said upper and lower guard means in co-operative supporting engagement upon said holding means.

6. The same structure as recited in claim 5 hereof and in which said depending guard means is provided with means for angular adjustment of the same about the axis of said cylindrical holding means.

7. In a device of the class described, a rigid guard-holding means adapted to extend transversely across the channel bars of the chassis of a truck tractor, means secured about the outside of said rigid holding means and having a flexible substantially flat guard means extending upwardly therefrom above the channel bars at least to a point sufficiently high to intercept the throw of moisture and other foreign matter from the rear wheels of a truck tractor.

8. In a device of the class described, a rigid guard-holding means adapted to extend transversely across and to be affixed to the channel bars of the chassis of a truck tractor, upwardly and downwardly extending means secured about the outside of said holding means and having flexible substantially flat guard means extending upwardly therefrom above the channel bars at least to a point sufficiently high to intercept the throw of moisture and other foreign matter from the rear wheels of a truck tractor.

9. In combination, a truck tractor having a cab body and chassis with front and rear wheels, rigid guard-holding means extending transversely across said chassis and positioned at a point between said rear wheels and said cab body, resiliently-acting guard means having its lower portion secured to said holding means and extending upwardly above said channel bars to a point to intercept the throw of moisture and other foreign matter from said rear wheels onto the rear of said cab body and elsewhere in the path of such throw, and unitary means for securing said guard means to said guard-holding means and for preventing the same from turning upon the same.

10. In combination, a truck tractor having a cab body and chassis with front and rear wheels, rigid tubular guard-holding means extending transversely across said chassis and positioned at a point between said rear wheels and said cab body, resiliently-acting substantially flat guard means having its lower portion mounted about said tubular guard-holding means and extending upwardly to a point to intercept the throw of moisture and other foreign matter from said rear wheels onto the rear of said cab body and elsewhere in the path of such throw.

References Cited in the file of this patent
UNITED STATES PATENTS

| | | |
|---|---|---|
| 1,579,623 | Atherton | Apr. 6, 1926 |
| 1,930,376 | Willett | Oct. 10, 1933 |
| 2,038,234 | Olen | Apr. 21, 1936 |
| 2,437,960 | Hughes | Mar. 16, 1948 |
| 2,461,044 | Ely | Feb. 8, 1949 |
| 2,569,494 | Prior | Oct. 2, 1951 |
| 2,585,397 | McCollum et al. | Feb. 17, 1952 |
| 2,605,119 | Earnest | July 29, 1952 |
| 2,619,363 | Wenham et al. | Nov. 25, 1952 |